US008732387B2

(12) United States Patent
Chen et al.

(10) Patent No.: US 8,732,387 B2
(45) Date of Patent: May 20, 2014

(54) FLASH MEMORY APPARATUS WITH AUTOMATIC INTERFACE MODE SWITCHING

(75) Inventors: Ming-Dar Chen, Hsinchu (TW); Chuan-Sheng Lin, Jhubei (TW); Hsiang-An Hsieh, Sijhih (TW)

(73) Assignee: A-Data Technology Co., Ltd., Taipei (TW)

( * ) Notice: Subject to any disclaimer, the term of this patent is extended or adjusted under 35 U.S.C. 154(b) by 1313 days.

(21) Appl. No.: 12/232,771

(22) Filed: Sep. 24, 2008

(65) Prior Publication Data

US 2009/0300273 A1     Dec. 3, 2009

(30) Foreign Application Priority Data

Jun. 2, 2008   (TW) .............................. 97120403 A

(51) Int. Cl.
*G06F 12/08*       (2006.01)
(52) U.S. Cl.
USPC .................... 711/103; 711/145; 711/E12.044
(58) Field of Classification Search
None
See application file for complete search history.

(56) References Cited

U.S. PATENT DOCUMENTS

| 5,872,994 | A  | * | 2/1999 | Akiyama et al. | 712/43 |
| 7,970,982 | B2 | * | 6/2011 | Kim et al. | 711/103 |
| 2004/0049627 | A1 | * | 3/2004 | Piau et al. | 711/103 |
| 2007/0245065 | A1 | * | 10/2007 | Kagan et al. | 711/103 |
| 2008/0189474 | A1 | * | 8/2008 | Kim et al. | 711/103 |
| 2009/0083476 | A1 | * | 3/2009 | Pua et al. | 711/103 |
| 2009/0235012 | A1 | * | 9/2009 | Rosner et al. | 711/103 |

* cited by examiner

*Primary Examiner* — Charles Rones
*Assistant Examiner* — Ryan Dare
(74) *Attorney, Agent, or Firm* — Rosenberg, Klein & Lee

(57) ABSTRACT

A flash memory controller with automatic interface mode switching is applied to a flash memory apparatus with a plurality of flash memories and the controller contains: a memory interface, a microprocessor, and an interface mode controller. The microprocessor recognizes the supported interface mode of every flash memory connected with the memory interface in an initial setting process, and individually sets the corresponding interface mode setting value into the interface mode controller. Thus, when the flash memory apparatus is operating in a normal operation state, the interface mode controller can output the corresponding interface mode setting value according to the present enabled flash memory, and the memory interface can adjust and switch the interface mode according to the interface mode setting value outputted by the interface mode controller. Thereby, the present invention can achieve the purpose whereby the flash memory apparatus can speed up accessing and increase efficiency.

7 Claims, 5 Drawing Sheets

FLASH MEMORY APPARATUS WITH AUTOMATIC INTERFACE MODE SWITCHING

BACKGROUND OF THE INVENTION

1. Field of the Invention

The present invention is related to a flash memory apparatus; in particular, to a flash memory apparatus which automatically switches the memory interface mode when operating with different types of flash memories.

2. Description of Related Art

Refer now to FIG. 1, which shows schematic block diagram of a prior art flash memory apparatus. As illustrated, the flash memory apparatus 9 comprises a plurality of flash memories 91, a controller 92 and a system interface 93. Herein the flash memory 91 can be for example of type of NAND flash memory, and the controller 92 is connected to an application system (not shown) through the system interface 93; e.g. a personal computer, a notebook computer, an industrial computer, a portable multimedia player, a digital camera, a digital recorder, and so forth. Also, the system interface 93 may be a parallel ATA interface (PATA), a serial ATA interface (SATA), a CompactFlash interface, a PCI-Express Interface, and a USB interface etc.

The controller 92 is connected to the flash memory 91 through at least a memory interface 921 and 922 (or referred as a channel), and each channel can be respectively connected to at least a flash memory 91. Furthermore, the controller 92, in terms of each memory interface 921 and 922, respectively provides a control signal 923 and 924 to control each flash memory 91. FIG. 1 shows a controller 92 of a dual channel.

Since the interface access speed of NAND-typed flash memory may differ due to factors such as manufacturer, capacity and fabrication process, there often is a design of adjustable memory interface access speed provided in the memory interface of the prior art flash memory controller. That is, the controller can identify the type of flash memory by means of reading the maker code of the flash memory and the device code of the flash memory itself, and can select suitable interface access speed. For example, if the memory interface access speed of the controller supports three different speeds, 70 ns, 50 ns, 25 ns (for reading or writing the trigger signal width indicator—represented by RE# or WE# enable signal width), the controller needs first to access the flash memory at the lowest speed (70 ns), identifies its code, confirms the interface access speed range supported by the flash memory, then it adjusts the interface circuit of the flash memory for tuning the interface timing, so as to select the highest access speed within the range supportable by the flash memory. In this way, it can avoid data errors caused by the interface access speed exceeding the supportable range of the flash memory; also, avoid the effect of under-performance of the flash memory apparatus access efficiency due to excessively low interface access speed.

Besides the difference in interface timing, with an effort to accelerate transmission speed of the memory interface, the industry has also proposed several new specifications, as well as standards for detecting and setting various interface modes. For example, the Open NAND Flash Interface (ONFI) standard lists, in addition to the back-compatible basic interface mode (Mode 0), five other different interface access modes; i.e. Mode 1~5. Among them, there are two types of interfaces whose action mode for signal access further support Extended Data Out (EDO) mode, in order to increase data transmission stability in the course of high speed access action.

Furthermore, in hybrid density flash memory apparatus, the flash memory in use may comprise two or more different types of flash memories. For instance, the memory fabrication technology for holding single bit data is referred as Single-Level-Cell (SLC) process, and the fabricated memory is known as Low Density Memory; meanwhile, the memory fabrication technology for holding multiple bit data is referred as Multi-Level-Cell (MLC) process, and the fabricated memory is known as High Density Memory. In this case, since the controller is simultaneously connected to two or more different types of flash memories, and although the memory interface of the controller can adjust its interface mode or interface timing, single interface can only be configured as one mode and one timing at one time. If one interface is connected to two or more different types of flash memories at the same time, then, after detecting and identifying the above-mentioned memories, the controller must select only the mode which is simultaneously supported by both types of memories for access (i.e. usually the slowest one). Or, each time before changing the access object, the controller must first adjusts the settings of the memory interface, which modifies the interface settings to the mode supported by the flash memory about to be accessed.

However, for the aforementioned operations, no matter it is selecting the use of the access mode commonly supported by all flash memories connected to the same interface (usually the slowest one), or frequently changing the settings of the memory interface before access to the memory, neither can achieve the objectives of fully exploiting the access efficiency of the flash memory apparatus and, at the same time, avoiding the problem of data errors.

SUMMARY OF THE INVENTION

In view of the above-mentioned issues, the technical problems which the present invention is directed to address are, after the initial setting procedures of flash memory detection, identification, and so on, the present invention may, in accordance with various access interface modes supported by each flash memory connected onto the memory interface, respectively specify relevant settings such as access timing and standard, further allowing the memory interface, under later normal operation condition, to switch the interface mode of the memory interface automatically based on the flash memory to be accessed and corresponding settings, so as to achieve the objectives of fully exploiting the access efficiency of the flash memory apparatus and avoiding the problem of data errors.

To achieve the above-mentioned objectives, one solution proposed by the present invention provides a flash memory apparatus with automatic memory interface mode switching, which comprises a flash memory controller connectable to a plurality of flash memories, further comprising: a plurality of control registers, a selection circuit, and an enable selection unit. The control registers are used to store the interface mode settings of the plurality of flash memories. The selection circuit is used to switch to output the interface mode settings. The enable selection unit is used to control the selection circuit and thereby selecting the plurality of control registers to output the interface mode settings.

Thereby the memory interface is allowed to automatically adjust and switch the interface mode represented by the interface mode settings according to the corresponding interface mode settings of the currently enabled chip enable pins, in order to acquire the enabled flash memory. Thus, it can achieve the objectives of fully exploiting the access efficiency of the flash memory apparatus and avoiding the problem of data errors.

The above-mentioned summary and the following detailed descriptions and appended drawings are all for further illustrating the approaches, means and effects taken by the present invention to achieve the prescribed objectives. Other purposes and advantages related to the present invention will be further construed in the subsequent descriptions and drawings.

DETAILED DESCRIPTION OF PREFERRED EMBODIMENTS

The present invention mainly provides improvements on flash memory controllers whose effects can be most significant when applied in conjunction with multiple flash memories supporting different interface modes (e.g. the NAND-typed flash memory of the Open NAND Flash Interface (ONFI) standard). The flash memory controller according to the present invention can, while performing initial setting procedures (e.g. detection and identification) on the flash memories by the flash memory apparatus, respectively set the settings for relevant access timing and standard according to the different access interface modes supported by each flash memory connected to the memory interface, and when the flash memory apparatus is under normal operation condition, the memory interface can adjust and switch the interface mode based on the outputted settings to access the currently enabled flash memories, thereby generating the effects of fully exploiting the access efficiency of the flash memory apparatus and avoiding the problem of data errors.

Figure 1:
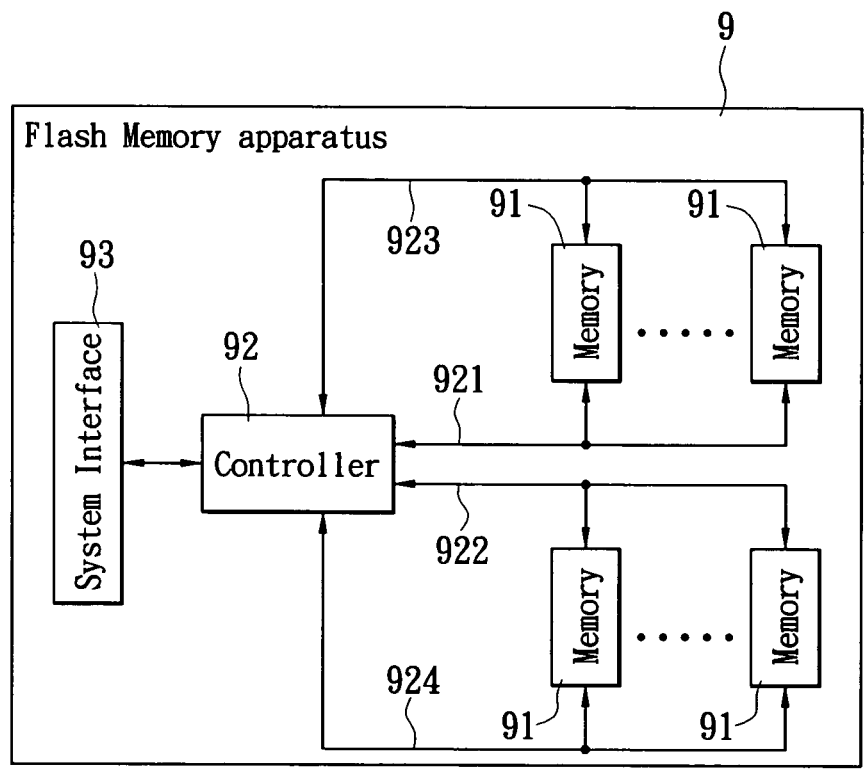
FIG. 1 shows schematic block diagram of a prior art flash memory apparatus.
Figure 2:
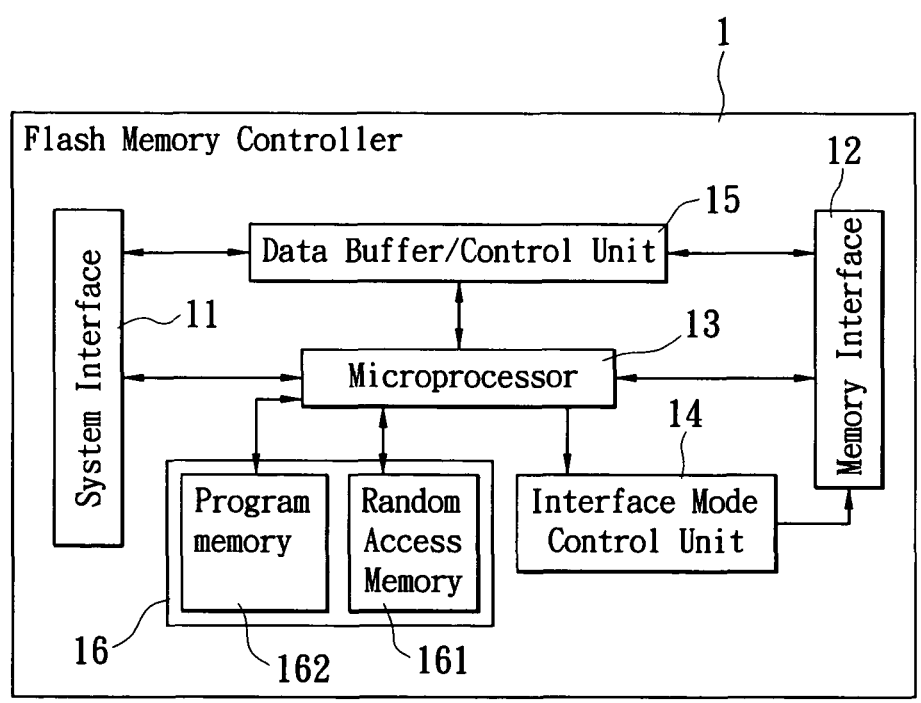
FIG. 2 is a schematic block diagram of an embodiment for a flash memory controller with automatic memory interface mode switching according to the present invention.

Refer now to FIG. 2, wherein a schematic block diagram of an embodiment for a flash memory controller with automatic memory interface mode switching according to the present invention is shown. As illustrated, the present embodiment provides a flash memory controller 1 which is applied in a flash memory apparatus (not shown) having a plurality of flash memories, the flash memory controller 1 comprising: a system interface 11, a memory interface 12, a microprocessor 13, an interface mode control unit 14, a data buffer/control unit 15 and a memory unit 16.

The system interface 11, connected to an application system (not shown), for use as a transmission interface between the flash memory controller 1 and the application system. The memory interface 12 is connected to the plurality of flash memories, and further provides a plurality of chip enable pins (CE# Pin) to correspondingly enable the plurality of flash memories. In other word, each of the plurality of flash memories in the flash memory apparatus must use respective chip enable pin in the memory interface 12 as its enable control, in order to determine the initiation of the respective flash memory. Certainly, the memory interface 12 is not limited to such a single group design, and each memory interface 12 can be considered as a memory channel; as a result, when designing a multi-group memory interface 12, the flash memory controller 1 can be a controller supporting multi-channel feature.

The microprocessor 13 is used to control the memory interface 12 in order to control the enable operation of the chip enable pins, and when the microprocessor 13 controls the enable operation of a specific chip enable pin, the flash memory connected to the specific pin will be enabled, thus the microprocessor 13 may access the enabled flash memory by way of the memory interface 12.

The interface mode control unit 14, connected to the microprocessor 13, is designed to correspond to the chip enable pins provided by the memory interface 12, so as to register a plurality of interface mode settings in correspondence to the chip enable pins. Therefore, the interface mode control unit 14 may later receive control from the microprocessor 13 so as to, according to which chip enable pin is presently being controlled by the microprocessor 13 to be in an enable operation, to switch to output the registered interface mode settings corresponding to the enabled chip enable pin.

Herein, while the microprocessor 13 operates under initial setting procedure, the microprocessor 13 is prescribed to control the interface mode control unit 14 to be set to a basic interface mode setting in correspondence to each chip enable pin, in order to fixedly switch to output such basic interface mode settings while under initial setting procedure, allowing the memory interface 12 to switch to a basic interface mode based on the basic interface mode settings. Thereby, this can cause the microprocessor 13 to be sequentially enabled and to identify the types of currently connected flash memory, thus acquiring the interface modes supported by each of these flash memories, and furthermore allows for setting and storing the interface mode settings of the interface modes in the interface mode control unit 14. The said basic interface mode belongs to a kind of back-compatible interface mode, which is an interface mode supportive to various flash memories, and usually this mode is the slowest in terms of access speed. And the microprocessor 13, in order to identify the types of the flash memories, would read out, for example, the maker codes and device codes of these flash memories.

Thereby, after completion of the initial setting procedure, when the flash memory apparatus later operates under a normal operation condition, the interface mode control unit 14 switches to output the corresponding interface mode settings in accordance with the presently enabled chip enable pin by the microprocessor 13, allowing the memory interface 12 to, based on the interface mode settings outputted by the interface mode control unit 14, automatically adjust and switch to the interface mode represented by the interface mode settings, facilitating access to the currently enabled flash memory.

Certainly, those skilled in the art can understand that the setting approach supported by the flash memory is achieved by the microprocessor 13, after having identified the interface modes supported by the flash memory under the basic interface mode, would then notify that the flash memory changes to the supported interface mode for transmissions (due to the fact that the supported interface mode is usually faster than the basic interface mode). And next, the microprocessor 13 sets the interface mode settings correspondingly stored in the interface mode control unit 14. Thereby the memory interface 12 later may switch to the interface mode that the flash memory supports, enabling both parties to employ the same interface mode for data transmission.

Subsequently, the data buffer/control unit 15, placed in the flash memory controller 1 is connected between the system interface 11 and the memory interface 12, used to receive the control from the microprocessor 13 and perform data transmissions between the application system and the flash memory. In addition, the memory unit 16 is connected to the microprocessor 13 and further consists of a random access memory 161 and a program memory 162 to operate conjunctively with the microprocessor 13. Therein the random access memory 161 is used to register the data generated during the process operations of the microprocessor 13; meanwhile, the program memory 162 is used to store the firmware programs executed by the microprocessor 13, and in practical programming, the program memory 162 may be for example a read only memory or a combination of read only memory and random access memory.

Additionally, the memory interface 12 discussed in the present embodiment may for example consist of a plurality of interface circuits (not shown), and may adjust and switch the interface circuits according to the interface mode settings switching outputted by the interface mode control unit 14 to implement the corresponding interface mode. Also, one of the above-mentioned interface circuits may furthermore be a programmable interface circuit, allowing the update of the firmware programs to actually modify the architecture in the interface circuit. In this way, in case newer interface mode standards are released, the flash memory controller 1 can provide support thereto by simply updating such firmware programs without the need to change the actual hardware design thereof.

The practical storage and switching phases of the aforementioned interface mode settings in the interface mode control unit 14 will now be further illustrated with reference to the following descriptions.

Figure 3:
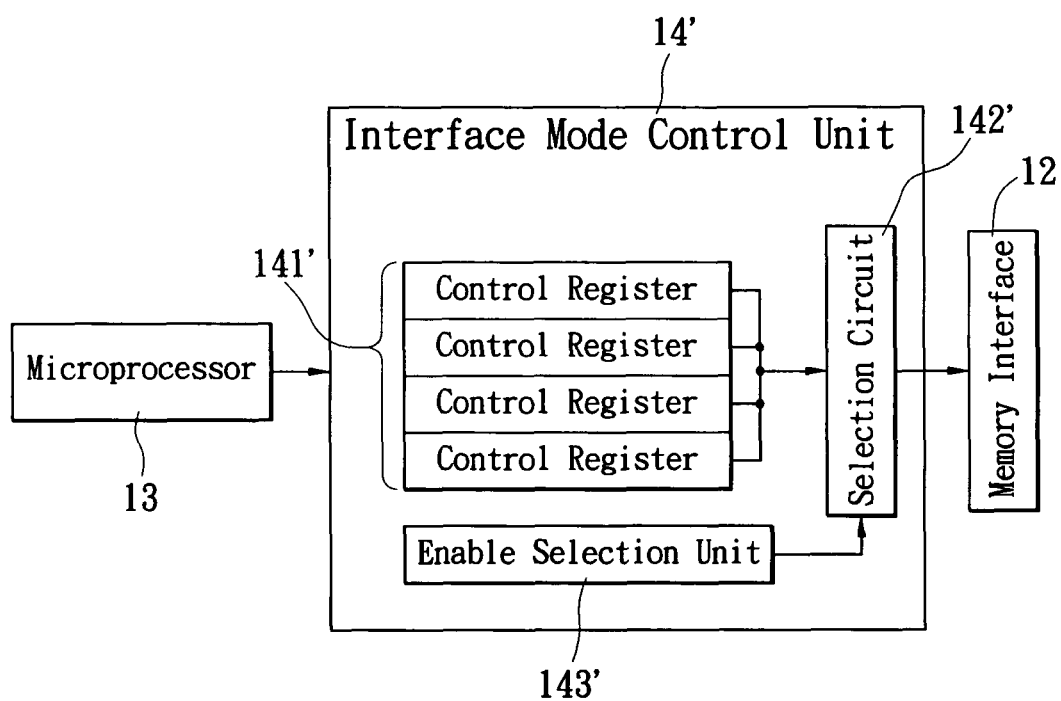
FIG. 3 is a schematic block diagram of a first embodiment for the interface mode control unit according to the present invention.

Refer now to FIG. 3, which shows a schematic block diagram of a first embodiment for the interface mode control unit according to the present invention. As illustrated, the interface mode control unit 14' provided by the present embodiment further comprises: a plurality of control registers 141', a selection circuit 142' and an enable selection unit 143'.

Herein the control registers 141' is designed in correspondence with the chip enable pins provided in the memory interface 12. During the initial setting procedure, the control registers 141' are used to receive the control settings from the microprocessor 13, and are all fixed to register the basic interface mode settings, allowing the microprocessor 13 to identify the interface modes that each flash memory supports. Also, the control registers 141' may further receive setting control from the microprocessor 13 to change and register the interface settings of the interface modes supported by the flash memories connected to such chip enable pins.

The selection circuit 142', connected to the control registers 141', for switching to output these interface mode settings to the memory interface 12. The enable selection unit 143', connected to the selection circuit 142', is used to, according to the chip enable pins currently enabled by the microprocessor 13, control the selection circuit 142' to select the corresponding control register 141' of the enabled chip enable pin, in order to output the interface mode settings inside the said control register 141' to the memory interface 12.

In practical operations, the present embodiment needs to repeatedly setting the same interface settings on each control register 141' in case that all flash memories connected to the memory interface 12 support the identical interface mode.

Figure 4:
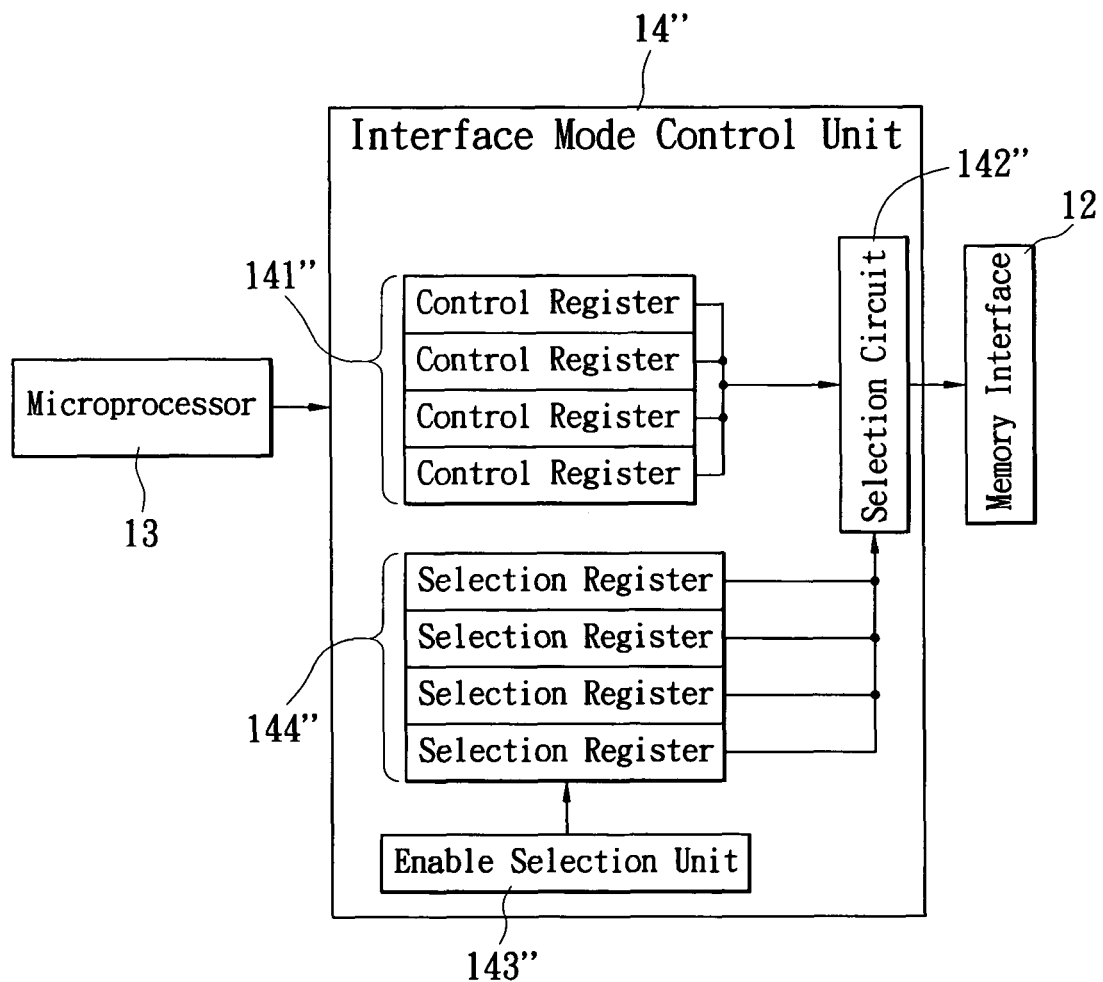
FIG. 4 is a schematic block diagram of a second embodiment for the interface mode control unit according to the present invention.

Refer now to FIG. 4, which shows a schematic block diagram of a second embodiment for the interface mode control unit according to the present invention. As illustrated, the interface mode control unit 14" provided in the present embodiment comprises: a plurality of control registers 141", a selection circuit 142", an enable selection circuit 143", and a plurality of selection registers 144".

Herein the control registers 141" is not designed according to chip enable pin correspondence, but to be used for registering the corresponding interface mode settings of all interface modes supported by currently connected flash memories. For example, there are five current known interface modes, then five control registers 141" will be designed to respectively register the corresponding interface mode settings of these interface modes. And the selection circuit 142" is connected to the control register 141" for receiving a selection signal for switching to output the stored interface mode settings within these control registers 141".

Whereas the differences between the present second embodiment and the first embodiment is that the present embodiment add the design of the selection registers 144", and the selection registers 144" are connected to the selection circuit 142", to classify and register the names of chip enable pins connected to these flash memories based on the interface modes supported by these flash memories, and also to register the selection signal used for corresponding to the control register 141". For example, suppose the microprocessor 13, in the course of sequentially identifying the interface modes respectively supported by these flash memories, identifies that the flash memories connected to two chip enable pins (e.g. CE0 and CE1) support the same interface mode (such as Mode 1), and the Mode 1 interface mode settings are for example registered in the second control register 141". Therefore, the first selection register 144" will be used to register the names of these chip enable pins (CE0 and CE1), and the selection signal used to correspondingly select the second control register 141".

Finally, the enable selection unit 143" is connected to the selection registers 144" in order to select the selection register 144" registering the names of the enabled chip enable pins based on the currently enabled chip enable pins by the microprocessor 13, so as to output the selection signal of the correspondingly selected control register 141" to the selection circuit 142".

Through the architecture designs of the above-mentioned embodiments, it is possible to implement the design of the flash memory controller 1 with automatic memory interface mode switching according to the present invention. However, for facilitating further illustrations of the operations in the process workflow about actually setting and switching the memory interface mode of the present invention, reference can be made, based on the above-mentioned flash memory controller 1, to FIG. 5 which shows a flowchart of an embodiment for the method of automatic memory interface mode switching according to the present invention.

Figure 5:
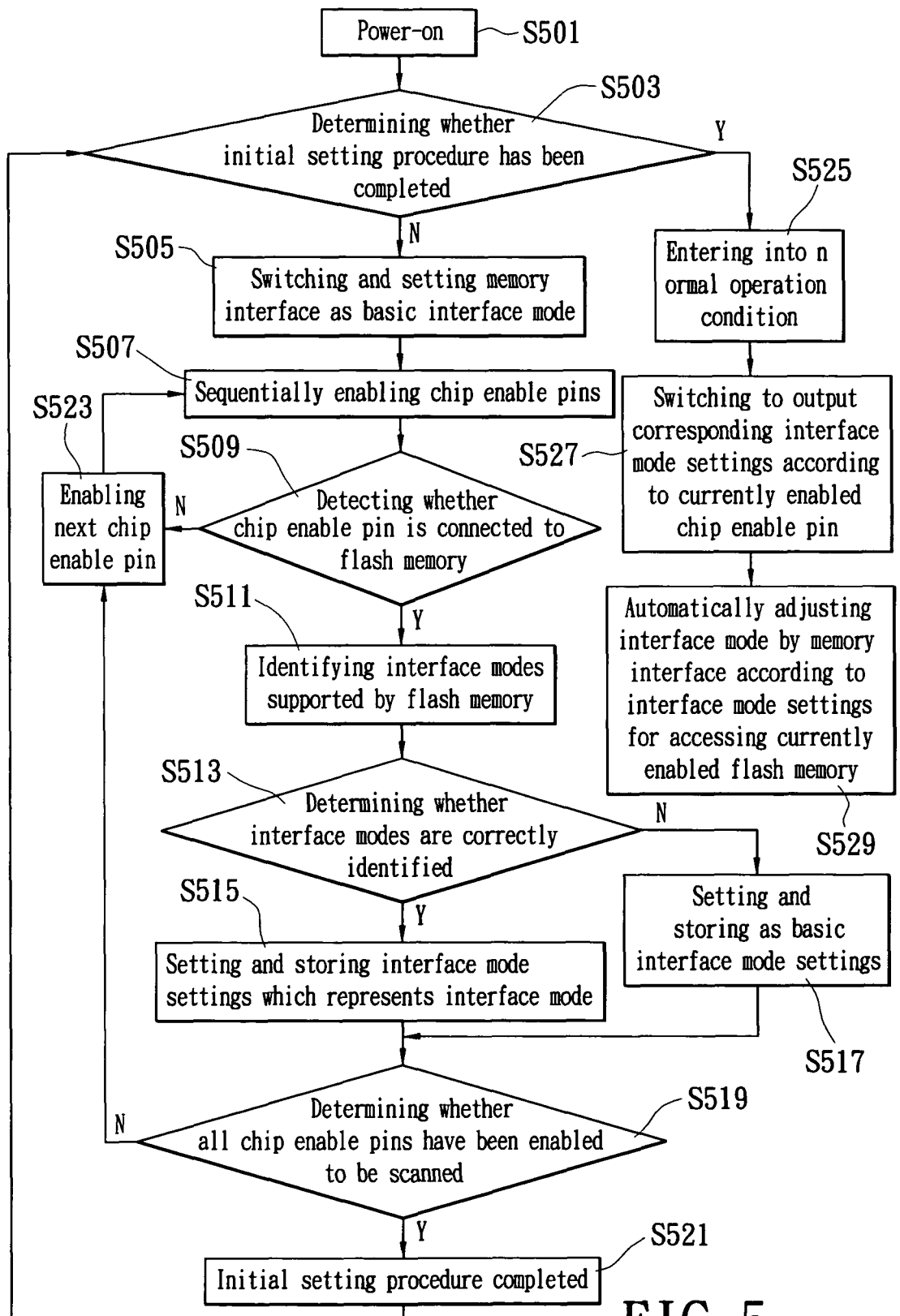
FIG. 5 is flowchart of an embodiment for the method of automatic memory interface mode switching according to the present invention.

As depicted in FIG. 5, the present embodiment provides a method of automatic memory interface mode switching, which is applicable to the flash memory controller 1, and the steps of the method comprise: first of all, connect the fabricated flash memory apparatus to the application system and power on the flash memory apparatus (S501). Next, the flash memory controller 1 determines whether an initial setting procedure has been completed (S503). If the initial setting procedure has not been finished, then the flash memory controller 1 enters into the initial setting procedure in order to switch and set the memory interface 12 to a basic interface mode by default values (S505).

Immediately next, starts to sequentially enable the chip enable pins provided in the memory interface 12 (S507), and each time only one chip enable pin is enabled for identification one by one. Now, detects whether the currently enabled chip enable pin is connected to a flash memory (S509), and if the detection of connection to a flash memory is yes, thus indicating the currently enabled chip enable pin is connected to a flash memory, and then the flash memory is activated by the said chip enable pin to start to operate. Following this, it may identifies the interface modes the said flash memory supports (S511), and subsequently determines whether the interface modes can be correctly identified (S513), so as to determine whether the flash memory controller 1 can be identified as supportive to the interface modes that the currently enabled and connected flash memory supports, in addition to the basic interface mode.

Suppose the determination in step (S513) is yes, indicating the flash memory controller 1 can identify and support the interface modes of the flash memory currently enabled and connected, thus it may, in terms of the said chip enable pin, correspondingly set and store the interface mode settings representing the interface mode (S515); contrarily, in case the determination in step (S513) is negative, indicating the flash memory controller 1 can not identify and support the interface modes of the current enabled and connected flash memory, and it can only, in terms of the said chip enable pin, correspondingly set and store basic interface mode settings (S517), such that the memory interface 12, when accessing the said flash memory later, switches to the basic interface mode for transmissions.

After the execution of step (S515) or step (S517), it determines whether all chip enable pins have been enabled to be scanned (S519). If the determination of scanning completion is yes, indicating the initial setting procedure is done (S521). Otherwise, if the determination of scanning completion is no (S519 is no), or else the result of detecting whether the current chip enable pin is connected to a flash memory in step (S509) is no, then it continues to enable the next chip enable pin (S523) until all chip enable pins have been enabled to be scanned.

Of course, to the workflow steps so far, since all are still within the phase of the initial setting procedure, the memory interface 12 thus communicates and transfers to the connected flash memories with the basic interface mode.

After the completion of the initial setting procedure, it continues to execute step (S503), causing the flash memory controller 1 to once more determine whether initial setting procedure has been done. The determination at this time is the completion of the initial setting procedure, and it then enters into a normal operation condition (S525); that is, allowing a user to be able to access data in the flash memory apparatus by means of operations in the application system.

Since the flash memory apparatus is configured in conjunction with multiple flash memories, and user data may be stored in differing flash memories, as a result, the flash memory controller 1 may enable and connect to the chip enable pin of some flash memory because of the need to access the specific flash memory. Then furthermore switches to output the corresponding interface mode settings to the memory interface 12 (S527) based on the currently enabled pin. Finally, according to the outputted interface mode settings, the memory interface 12 automatically switches to the interface mode represented by the interface mode settings, such that the flash memory controller 1 can perform data accesses and transmissions with the currently enabled flash memory through the switched interface mode (S529). Thereby the operation workflow for the method of automatic memory interface switching of the present embodiment is completed.

In summary, the advantages of the present invention lie in that, when the fabrication of flash memory apparatus is completed, the flash memory controller first performs the initial setting procedure of flash memory detection, identification, etc.; then, in conjunction with various access interface modes supported by each flash memory connected thereto, further sets the relevant settings such as access timing, standard and the like; and then allows the memory interface, under normal operation condition, to switch the interface mode of the memory interface automatically based on the flash memory currently to be accessed and the corresponding settings, in order to achieve the objectives of fully exploiting the access efficiency of the flash memory apparatus and avoiding the problem of data errors.

The above-stated illustrations simply set out the detailed descriptions and appended drawings for embodiments of the present invention, which are by no means used to limit the present invention thereto. The scope of the present invention should be defined by the following claims, and all changes or modifications that any ones skilled in relevant arts can conveniently consider within the field of the present invention are deemed to be encompassed by the scope of the present invention.

What is claimed is:

1. A flash memory apparatus with automatic memory interface mode switching, comprising:
   a flash memory controller connectable to a plurality of flash memories, comprising:
   a memory interface, connected to the plurality of flash memories and having a plurality of chip enable pins, wherein each of the chip enable pins is configured to correspondingly initiate one of the plurality of flash memories;
   a microprocessor for enabling an operation of the chip enable pin allowing for the memory interface to access the plurality of flash memories;
   a system interface, which is connected to an application system;
   a data buffer/control unit, connected between the system interface and the memory interface, controlled by the microprocessor for facilitating data transmissions between the application system and the plurality of flash memories; and
   a memory unit connected to the microprocessor;
   a plurality of control registers, which are used to store interface mode settings of the plurality of flash memories;
   a selection circuit;
   an enable selection unit, which is used for controlling the selection circuit, which in turn to select the plurality of control registers to output the interface mode settings; and
   a plurality of selection registers, connected to the selection circuit, for classifying and registering the chip enable pin connected to the flash memories based on the interface mode supportable by the plurality of flash memories, and for registering selection signals corresponding to the control registers.

2. The flash memory apparatus with automatic memory interface mode switching according to claim 1, wherein the memory interface comprises a plurality of interface circuits, so as to adjust and switch the plurality of interface circuits based on the interface mode settings.

3. The flash memory apparatus with automatic memory interface mode switching according to claim 2, wherein one of the plurality of interface circuits is a programmable interface circuit updatable by firmware programs.

4. The flash memory apparatus with automatic memory interface mode switching according to claim 1, wherein the microprocessor reads a make code and a device code of the flash memories to identify types of the plurality of flash memories.

5. The flash memory apparatus with automatic memory interface mode switching according to claim 1, wherein the memory unit further comprises:
 a random access memory; and
 a program memory, which is used to store firmware programs being executed by the microprocessor.

6. The flash memory apparatus with automatic memory interface mode switching according to claim 1, wherein
 the memory interface is configured to be a basic interface mode when initialized;
 the plurality of chip enable pins are sequentially enabled before the interface mode supportable by each of the plurality of flash memories connected to the chip enable pin is identified, and before the interface mode setting according to the interface mode of the flash memory is stored; and
 the interface mode is switched based on the stored interface mode setting for an access to the flash memory that is connected to the enabled chip enable pin.

7. The flash memory apparatus with automatic memory interface mode switching according to claim 6, wherein when the interface mode supportable by the flash memory is not identified the interface mode for the access to the flash memory is set to the basic interface mode.

* * * * *